(12) United States Patent
Satou (10) Patent No.: US 8,743,528 B2
(45) Date of Patent: Jun. 3, 2014

(54) CAPACITOR

(75) Inventor: Hisashi Satou, Kirishima (JP)

(73) Assignee: Kyocera Corporation, Kyoto-shi (JP)

( * ) Notice: Subject to any disclaimer, the term of this patent is extended or adjusted under 35 U.S.C. 154(b) by 151 days.

(21) Appl. No.: 13/393,426

(22) PCT Filed: Sep. 29, 2011

(86) PCT No.: PCT/JP2011/072421
§ 371 (c)(1),
(2), (4) Date: Feb. 29, 2012

(87) PCT Pub. No.: WO2012/043740
PCT Pub. Date: Apr. 5, 2012

(65) Prior Publication Data
US 2012/0218678 A1 Aug. 30, 2012

(30) Foreign Application Priority Data

Sep. 29, 2010 (JP) ................................ 2010-219068

(51) Int. Cl.
*H01G 4/005* (2006.01)
*H01G 4/228* (2006.01)
*H01G 4/06* (2006.01)

(52) U.S. Cl.
USPC .................... 361/303; 361/306.1; 361/321.1; 361/321.2

(58) Field of Classification Search
USPC .......................... 361/321.1–321.2, 306.1, 303
See application file for complete search history.

(56) References Cited

U.S. PATENT DOCUMENTS

| 2006/0039097 A1 | 2/2006 | Satou |
| 2009/0226705 A1 | 9/2009 | Motoki et al. |

FOREIGN PATENT DOCUMENTS

| JP | 63-86414 A | | 4/1988 |
| JP | 07-201636 A | | 8/1995 |
| JP | 07201636 A | * | 8/1995 |
| JP | 2006-60148 A | | 3/2006 |
| JP | 2009-212298 A | | 9/2009 |

OTHER PUBLICATIONS

International Search Report dated Dec. 27, 2011, issued in PCT/JP2011/072421 (1 page).

* cited by examiner

*Primary Examiner* — Eric Thomas
*Assistant Examiner* — Arun Ramaswamy
(74) *Attorney, Agent, or Firm* — Westerman, Hattori, Daniels & Adrian, LLP (57) ABSTRACT

[Object] To provide a capacitor in which generation of warpage of a laminate can be prevented.
[Solution] A capacitor 1 includes a laminate 2 in which a plurality of dielectric layers 6 are laminated, an inner electrode 3 disposed between the dielectric layers 6 of the laminate 2, an outer electrode 4 that is disposed on an end face of the laminate 2 so as to be connected to the inner electrode 3 and that has an extending portion 4A extending to a first main surface 2A of the laminate 2, and an underlying layer 5 including a base 5a disposed between the extending portion 4A and the first main surface 2A and metal particles 5b that are contained in the base 5a and that are joined to the outer electrode 4. With this structure, it is possible to provide a capacitor 1 in which warpage is not easily generated in the laminate 2 during sintering.

18 Claims, 7 Drawing Sheets

CAPACITOR

TECHNICAL FIELD

The present invention relates to a capacitor.

BACKGROUND ART

In general, a capacitor includes a laminate in which a plurality of dielectric layers are laminated, inner electrodes provided between the dielectric layers of the laminate, and outer electrodes provided on end faces of the laminate so as to be connected to the inner electrodes and each having an extending portion extending to a first main surface. For example, a plating method is used as a method for forming the outer electrodes. In the case where the extending portion of the outer electrode is formed by this method, an underlying electrode layer is formed in advance on an area where the extending portion is to be formed, the area being located on the first main surface of the laminate. The extending portion of the outer electrode is then formed on the underlying electrode layer by a plating method.

CITATION LIST

Patent Literature

PTL 1: Japanese Unexamined Patent Application Publication No. 7-201636

SUMMARY OF INVENTION

Technical Problem

In preparation of such a capacitor, a laminate of dielectric layers and an underlying electrode layer are sintered at a high temperature before the formation of outer electrodes.

In this case, the laminate is mainly composed of a ceramic component whereas the underlying electrode layer is mainly composed of a metal component. Therefore, the sintering shrinkage ratios of the laminate and the underlying electrode layer are significantly different from each other, which can result in a problem that warpage of the laminate is easily generated.

The present invention has been made in view the above problem, and the object of the present invention is to provide a capacitor in which the generation of warpage can be suppressed.

Solution to Problem

A capacitor of the present invention includes a laminate in which a plurality of dielectric layers are laminated, an inner electrode disposed between the dielectric layers of the laminate, an outer electrode that is disposed on an end face of the laminate so as to be connected to the inner electrode and that has an extending portion extending to a first main surface of the laminate, and an underlying layer including a base disposed between the extending portion and the first main surface and metal particles that are contained in the base and that are joined to the outer electrode.

Advantageous Effects of Invention

According to the above structure, it is possible to provide a capacitor in which warpage is not easily generated in a laminate during sintering.

BRIEF DESCRIPTION OF DRAWINGS

[FIG. 1]

[FIG. 2]

[FIG. 3] FIG. 3($a$) is an enlarged cross-sectional view near an underlying layer, and FIG. 3($b$) is a cross-sectional view that schematically illustrates the underlying layer illustrated in FIG. 3($a$).

[FIG. 5] FIG. 5($a$) is a perspective view illustrating another example of the present invention, and FIG. 5($b$) is a cross-sectional view taken along line X-X of the capacitor illustrated in FIG. 5($a$).

[FIG. 6]

[FIG. 7] FIGS. 7($a$) to ($c$) are each an enlarged cross-sectional view in a joined portion between an underlying layer and an extending portion.

[FIG. 8] FIG. 8($a$) is an enlarged cross-sectional view near an underlying layer in another example of the present invention, and FIG. 8($b$) is a cross-sectional view that schematically illustrates the underlying layer illustrated in FIG. 8($a$).

DESCRIPTION OF EMBODIMENTS

An example of a capacitor according to an embodiment of the present invention will now be described in detail with reference to the drawings.

Figure 1:
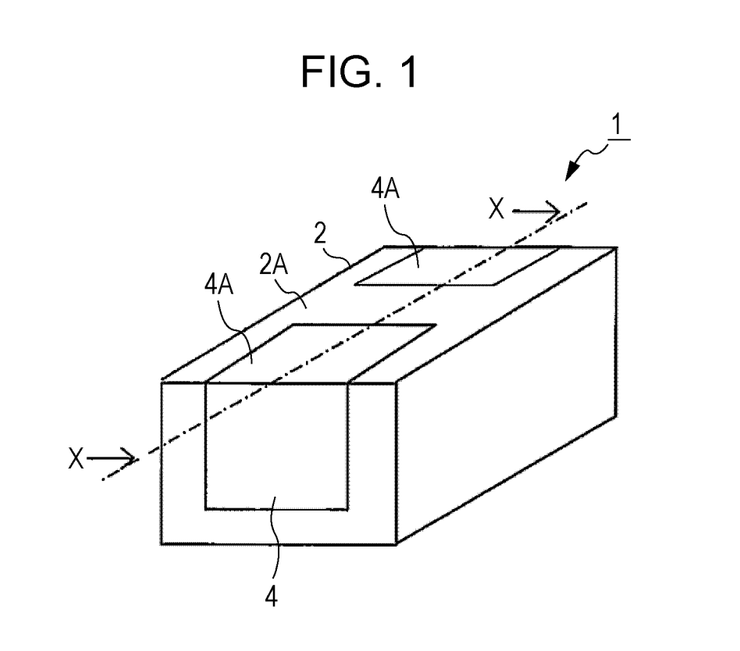
FIG. 1 is a perspective view illustrating an example of a capacitor according to an embodiment of the present invention.

A capacitor 1 illustrated in FIG. 1 includes a laminate 2, inner electrodes 3, outer electrodes 4, and an underlying layer 5.

The laminate 2 is obtained by laminating a plurality of dielectric layers 6. This laminate 2 can be a rectangular parallelepiped dielectric block obtained by laminating, for example, 20 to 2,000 rectangular dielectric layers 6 each having a thickness of, for example, 1 to 5 μm. Regarding the dimensions of the laminate 2, the length of the long side of the laminate 2 can be, for example, 0.4 to 3.2 mm and the length of the short side of the laminate 2 is, for example, 0.2 to 1.6 mm.

The material used as the dielectric layers 6 can be a dielectric material containing, as a main component, a ceramic having a relatively high dielectric constant, for example, barium titanate, calcium titanate, or strontium titanate.

Figure 2:
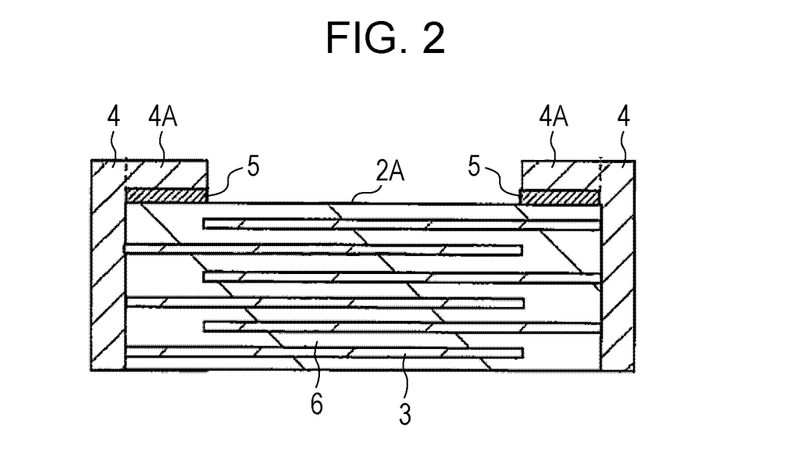
FIG. 2 is a cross-sectional view taken along line X-X of the capacitor illustrated in FIG. 1.

Twenty to two thousand layers of the inner electrodes 3 can be provided between the dielectric layers 6 of the laminate 2. As illustrated in FIG. 2, an end of each of the inner electrodes 3 reaches an end face of the laminate 2, and is connected to one of the outer electrodes 4 on the end face. Some of the inner electrodes 3 illustrated in FIG. 2 are connected to the outer electrode 4 on the right side of FIG. 2, and other inner electrodes 3 arranged to be adjacent to these inner electrodes 3 are connected to the outer electrode 4 on the left side of FIG. 2. The inner electrodes 3 between the dielectric layers 6 are alternately connected, one by one, to the outer electrodes 4 formed on both ends of the laminate 2.

Regarding the dimensions of each of the inner electrodes 3, the length in the longitudinal direction of the laminate 2 in FIG. 2 can be, for example, 0.39 to 3.1 mm, the length in the short-side direction of the laminate 2 is, for example, 0.19 to 1.5 mm, and the thickness can be, for example, 0.5 to 2 μm.

The material used as the inner electrodes 3 can be a conductor material containing a metal, for example, nickel, copper, silver, or palladium as a main component.

As illustrated in FIGS. 1 and 2, each of the outer electrodes 4 is provided on an end face of the laminate 2 so as to be connected to the inner electrodes 3, and includes an extending portion 4A extending to a first main surface 2A. Regarding the dimensions of a portion of the end face of the outer electrode 4, for example, the length in the laminating direction of the laminate 2 can be 0.2 to 2.0 mm, and the length in the short-side direction of the laminate 2 can be 0.2 to 1.6 mm. Regarding the dimensions of the extending portion 4A of the outer electrode 4, for example, the length in the longitudinal direction of the laminate 2 can be 0.1 to 0.85 mm, and the length in the short-side direction of the laminate 2 can be 0.2 to 1.6 mm. The outer electrodes 4 can be of plating films formed by an electroless plating method or an electrolytic plating method, as described below.

Figure 3:
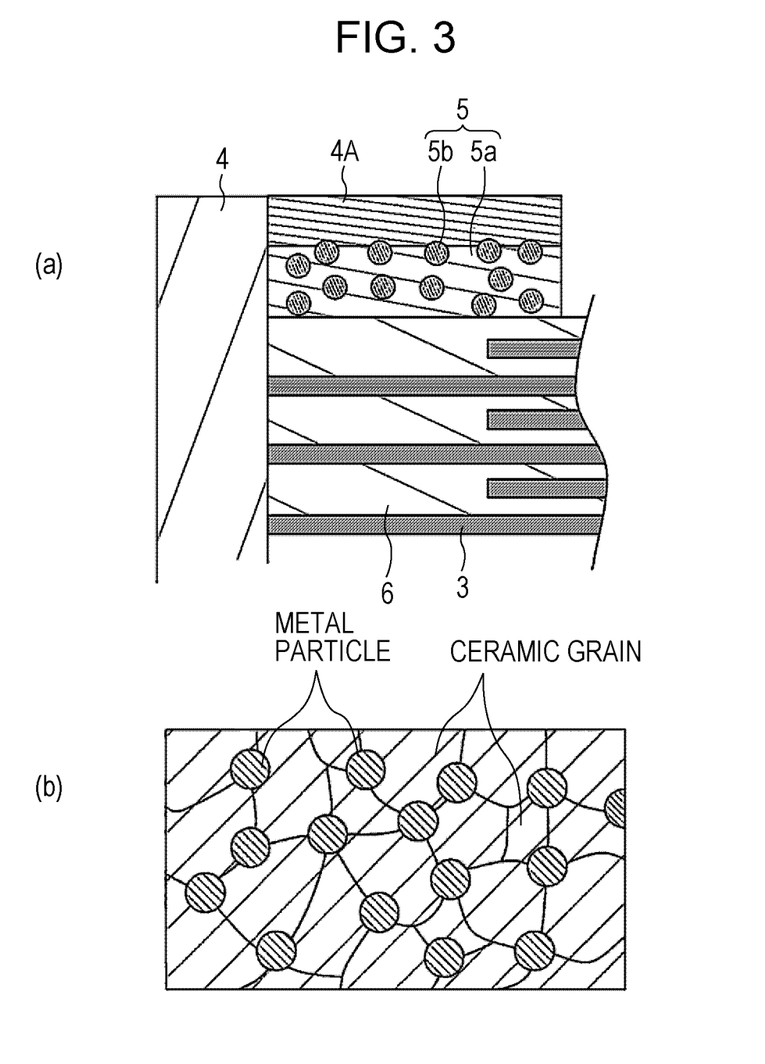

As illustrated in FIG. 2, the underlying layer 5 is provided between the extending portion 4A and the first main surface 2A. As illustrated in FIG. 3(a), the underlying layer 5 includes a base 5a and metal particles 5b. The base 5a is provided between the extending portion 4A and the first main surface 2A. The metal particles 5b are contained in the base 5a and joined to the outer electrodes 4. As illustrated in FIG. 3(b), this underlying layer 5 includes the metal particles 5b dispersed in a ceramic sintered body (base 5a), in which ceramic grains have been bonded to each other by sintering.

According to this structure, since the main component of the underlying layer 5 is a ceramic component, the ceramic component of the underlying layer 5 and the ceramic component of the first main surface 2A have substantially the same sintering shrinkage ratio. Thus, it is possible to provide a capacitor 1 in which warpage is not easily generated in the laminate 2 during sintering.

FIG. 3(a) illustrates the metal particles 5b and the extending portion 4A with different hatchings, but this does not have to mean that they are made of different components. Since the extending portion 4A is formed by a plating method using the metal particles 5b as starting points, the metal particles 5b are substantially a part of the extending portion 4A and integrated with the extending portion 4A. Accordingly, when FIG. 3(a) is viewed from a different standpoint, a part of the extending portion 4A substantially protrudes into the underlying layer 5, and thus the extending portion 4A is not easily separated from the underlying layer 5 by an anchoring effect.

As illustrated in FIG. 2, the underlying layer 5 is partially provided on both end face sides of the first main surface 2A. The reason why the underlying layer 5 is partially provided at these positions is that the underlying layer 5 is formed in advance at positions where the outer electrodes 4 are to be provided. In addition, the underlying layer 5 is provided on the first main surface 2A, but is not provided on the end faces of the laminate 2. With this structure, it is possible to prevent the underlying layer 5, which contains a ceramic as a main component, from covering exposed portions of the inner electrodes 3 on the end faces. Thus, electrical connection between the inner electrodes 3 and the outer electrode 4 can be secured.

In the case where the base 5a of the underlying layer 5 is formed of a ceramic sintered body, barium titanate, calcium titanate, strontium titanate, or the like can be used as a ceramic component forming the ceramic sintered body. In particular, such a ceramic component can be the same as the ceramic component forming the dielectric layers 6 described above. This is because the underlying layer 5 is more strongly bonded to the laminate 2 in this case. Furthermore, the ceramic sintered body (base 5a) of the underlying layer 5 and the laminate 2 can be particularly composed of the same ceramic component because the sintering shrinkage ratios of the ceramic sintered body and the laminate 2 can be made more uniform, and the sintering behaviors of the ceramic sintered body and the laminate 2 can be made substantially the same, and thus warpage of the laminate 2 can be further reduced.

The metal particles 5b can be composed of, for example, copper, silver, nickel, palladium, or an alloy of these metals. In addition, the metal particles 5b can be particularly composed of the same material as the metal component of the outer electrodes 4. This is because the outer electrodes 5 are more strongly bonded to the laminate 2 in the case where the outer electrodes 4 are formed by an electroless plating method as described below.

A content ratio of the ceramic sintered body (base 5a) in the underlying layer 5 can be particularly 70% to 95% by weight, and a content ratio of the metal particles 5b in the underlying layer 5 can be particularly 5% to 30% by weight. Herein, the term "content ratio" refers to a weight ratio of the ceramic sintered body (base 5a) or the metal particles 5b relative to the underlying layer 5. When the content ratio of the metal particles 5b is 5% by weight or more, the metal particles 5b are appropriately present in the underlying layer 5. Accordingly, when electroless plating or electrolytic plating is performed on the underlying layer 5, the extending portion 4A of the outer electrode 4 can be uniformly formed on the underlying layer 5. In addition, when the content ratio of the ceramic sintered body (base 5a) is 70% by weight or more, the underlying layer 5 contains a ceramic component as a main component, and thus the sintering shrinkage ratio of the underlying layer 5 becomes substantially the same as the sintering shrinkage ratio of the ceramic component. Consequently, the generation of warpage of the laminate can be suppressed during sintering.

In particular, in the underlying layer 5, the distance between the dispersed metal particles 5b can be particularly 10 μm or less. In this case, the extending portion 4A can be formed without disconnecting a portion formed by plating. Moreover, the distance between the dispersed metal particles 5b can be particularly 5 μm or less. In this case, the extending portion 4A can be uniformly formed, and it is possible to form an outer electrode in which unevenness of the film thickness is suppressed. The average particle diameter of the dispersed metal particles 5b can be, for example, 0.5 to 5 μm. The shape of the dispersed metal particles 5b can be any of a spherical shape, an elliptical shape, and a needle-like shape, for example. Note that even in the case where the metal particles 5b have a shape other than a spherical shape, such as an elliptical shape or a needle-like shape, an average particle diameter is determined on the assumption that the metal particles 5b have a spherical shape, and the value of the average particle diameter is assumed to be, for example, 0.5 to 5 μm. The method for determining the average particle diameter in this case will be described below.

The underlying layer 5 includes a side of the extending portion 4A and a side of the first main surface 2A. In particular, the content ratio of the metal particles 5b at the side of the extending portion 4A can be higher than that at the side of the first main surface 2A. With this structure, since the content ratio of the ceramic sintered body (base 5a) is high on the first main surface 2A side of the underlying layer 5, the underlying layer 5 easily adheres to the first main surface 2A. On the other hand, since the content ratio of the metal particles 5b is high on the extending portion 4A side of the underlying layer 5, the extending portion 4A can be easily formed when plating is performed.

The ratio of the exposed area of the metal particles 5b to the surface area of the underlying layer 5 on the extending portion 4A side can be particularly 5% to 45%. When the ratio of the exposed area of the metal particles 5b is 5% or more, a metal portion is appropriately present on the surface of the underlying layer 5. Therefore, when electroless plating or electrolytic plating is performed on the underlying layer 5, the extending portion 4A of the outer electrode 4 can be uniformly formed on the underlying layer 5. When the ratio of the exposed area of the metal particles 5b is 45% or less, during a sintering step, it is possible to prevent the metal particles 5b from being excessively close to each other and agglomerating, and to form a state where the metal particles 5b are appropriately dispersed.

In order to determine the ratio of the exposed area of the metal particles, first, the exposed area of the metal particles is determined. For this purpose, first, a capacitor on which the outer electrodes 4 have not been formed and the underlying layer 5 is exposed is subjected to barrel polishing and dried. Next, a surface of the underlying layer 5 on the extending portion 4A side is observed with an electron microscope, and a SEM photograph of a region of 0.1 to 0.2 mm square is taken. Next, an image processing is performed on an electronic file of the SEM photograph with binarization software, and the total exposed area of the metal particles in the image is then calculated. By dividing the calculated exposed area by the area of the region of the SEM photograph, the ratio of the exposed area of the metal particles can be determined.

The average particle diameter of the metal particles is determined as follows. First, the total exposed area of the metal particles is divided by the number of metal particles in the region of the SEM photograph to calculate the exposed area per metal particle. An apparent average particle diameter can be determined by dividing this value of the exposed area by the circular constant (pi), and raising the quotient to the power of 0.5. A true average particle diameter can be determined by multiplying 1.155 by the apparent average particle diameter. Even in the case where the metal particles 5b have a shape other than a spherical shape, such as an elliptical shape or a needle-like shape, the shape of the metal particles 5b is assumed to be a spherical shape, and the apparent average particle diameter and the true average particle diameter are determined by the method described above.

In order to determine the content ratio of the metal particles, first, the volume per metal particle is determined on the basis of the average particle diameter of the metal particles. Furthermore, the number of metal particles present in the region of the SEM photograph is raised to the power of 1.5 to determine the true number of metal particles in the region of the underlying layer 5. By multiplying the number of metal particles thus determined by the volume per metal particle, the total volume of the metal particles is determined. Next, this value of the total volume is divided by the volume of the underlying layer 5 in the region of the SEM photograph to determine a volume ratio. By multiplying this volume ratio by a specific gravity ratio of the metal particles 5b and the base 5a (ceramic), a weight ratio can be determined.

The distance between metal particles is determined by dividing the length of one side of the region in the SEM photograph by a value calculated by raising the number of metal particles present in the region to the power of 0.5.

The capacitor 1 having the above-described structure can be prepared by a ceramic green sheet laminating method described below.

Specifically, a plurality of green sheets to be formed into dielectric layers 6 are prepared. In this step, the ceramic green sheets are formed by adding an appropriate resin component, an organic solvent, etc. to a ceramic raw material powder and mixing the resulting mixture to prepare a slip-like ceramic slurry, and forming the slurry by a doctor blade method or the like.

Next, a conductive paste to be formed into inner electrodes 3 is applied onto the green sheets. In this step, the conductive paste is applied by a screen printing method or the like.

Next, a mixed material paste is applied onto the first main surface 2A of the laminate 2. The mixed material paste eventually becomes the underlying layer 5 by sintering. The mixed material paste contains metal particles 5b and a ceramic component to be formed into a ceramic sintered body (base 5a).

Next, in order to obtain a green body of a capacitor 1, the plurality of ceramic green sheets are laminated and pressed, and then cut into pieces.

Next, the green body of the capacitor 1 is fired to obtain the laminate 2. In this step, the laminate 2 can be obtained by firing at, for example, 800° C. to 1,050° C. In this step, the green sheets become the dielectric layers 6, the conductive paste becomes the inner electrodes 3, and the mixed material paste becomes the underlying layer 5.

Figure 4:
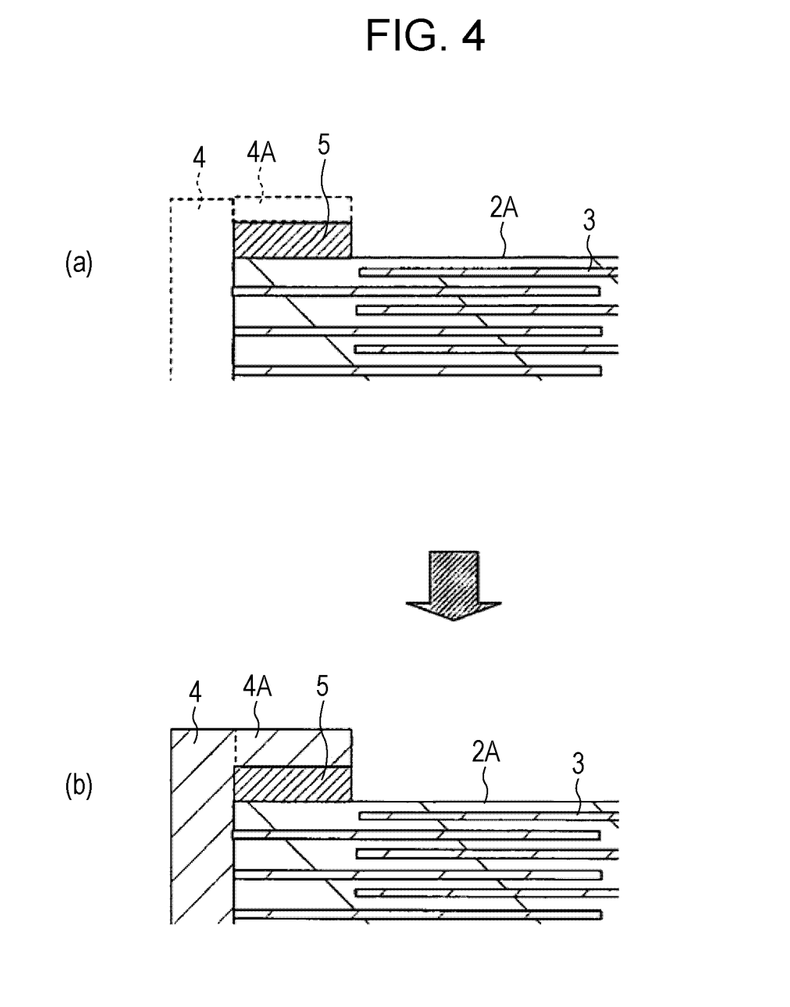
[FIG. 4] FIG. 4 includes cross-sectional views illustrating steps of forming an outer electrode of a capacitor of the present invention.

Next, as illustrated in FIGS. 4(a) and (b), outer electrodes 4 and extending portions 4A can be formed by an electroless plating method or an electrolytic plating method. In this method, the outer electrodes 4 and the extending portions 4A can be formed by depositing copper on the underlying layer 5 and the inner electrodes 3 exposed on an end face of the laminate 2, and connecting these deposited copper portions to each other. The thickness of each of the outer electrodes 4 and the extending portions 4A thus obtained can be about 5 to 50 μm.

In order to connect the deposited copper portions to each other, the distance between the inner electrodes 3 exposed on the end face can be particularly about 10 μm or less. The distance between the underlying layer 5 and an inner electrode 3 can be particularly the same as the above. The structure is not limited to this example, and a metal film can be formed in advance so as to cover an end face of the laminate. This metal film is electrically connected to the inner electrodes 3 exposed on the end surface of the laminate 2. By performing plating on this metal film, an outer electrode 4 having a more uniform thickness can be more easily formed.

The material of the outer electrodes 4 and the extending portions 4A thus obtained can be a metal material other than copper, such as silver, nickel, palladium or an alloy of these metals.

Next, if necessary, a plating layer 2b such as a nickel (Ni) plating layer, a gold (Au) plating layer, a tin (Sn) plating layer, or a solder plating layer can be formed on the surfaces of the outer electrodes 4 and the extending portions 4A to obtain the capacitor 1.

The present invention is not limited to the example of the embodiment described above, and various changes, improvements, and the like can be made without departing from the gist of the present invention.

For example, the laminate 2 can be chamfered to form rounded portions. By performing this step, it is possible to eliminate the removal of microcracks in the rounded portions of the resulting laminate 2 and to prevent the generation of chipping of the rounded portions. Furthermore, to perform barrel polishing provides an effect of removing a surface oxide film of the metal particles exposed on the surface of the underlying layer 5 on the extending portion 4A side, exposing the metal surfaces, and improving plating adhesion.

Figure 5:
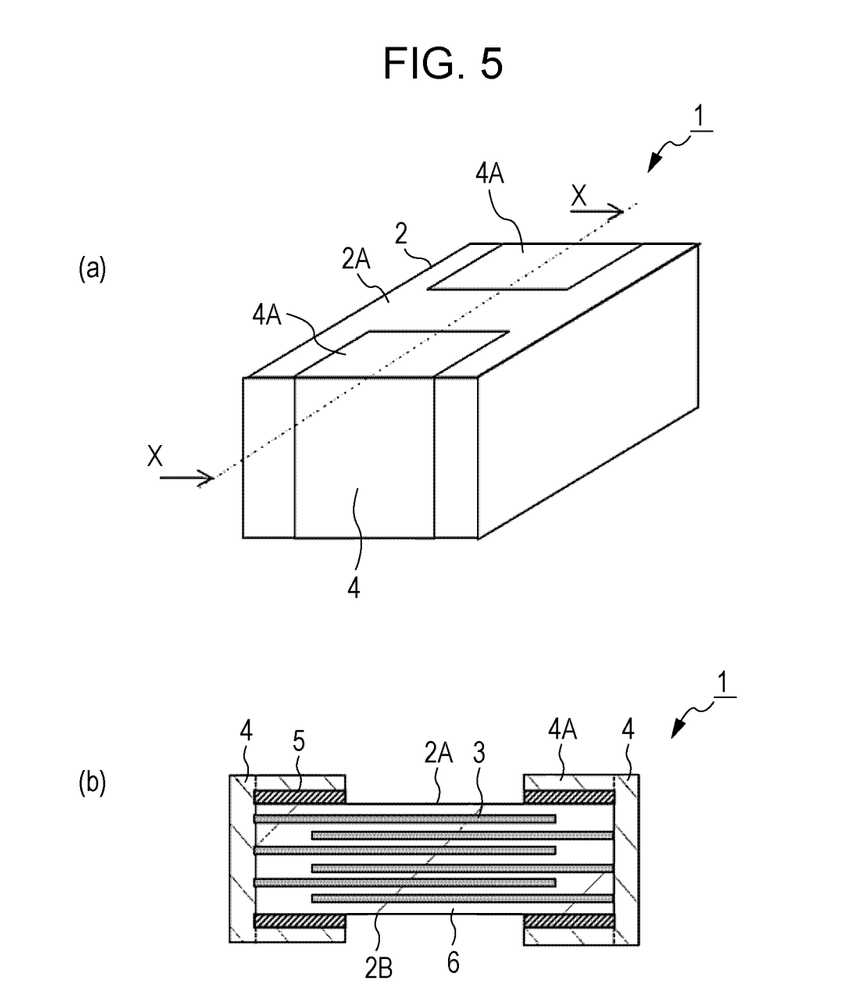

For example, in the example illustrated FIGS. 1 and 2, the extending portions 4A and the underlying layer 5 are provided only on one main surface (first main surface 2A) of the laminate 2. Alternatively, as illustrated in FIG. 5(b), the extending portions 4A and the underlying layer 5 can be further provided in the same manner on another main surface (second main surface) 2B of the laminate 2.

Alternatively, the base 5a of the underlying layer 5 can be formed of a resin formed body instead of a ceramic sintered body. The resin formed body can be composed of, for example, an epoxy resin or the like. In order to form the underlying layer 5 including a base 5a formed of a resin formed body, a resin paste containing metal particles can be applied onto a laminate 2 after sintering, and the resin paste is then cured by heating. Even when an underlying layer 5 including a base 5a formed of a resin formed body is used in this manner, the same advantages as those in the case of a ceramic sintered body can be obtained as long as the sintering shrinkage ratio of the resin formed body is close to that of the laminate 2.

Figure 6:
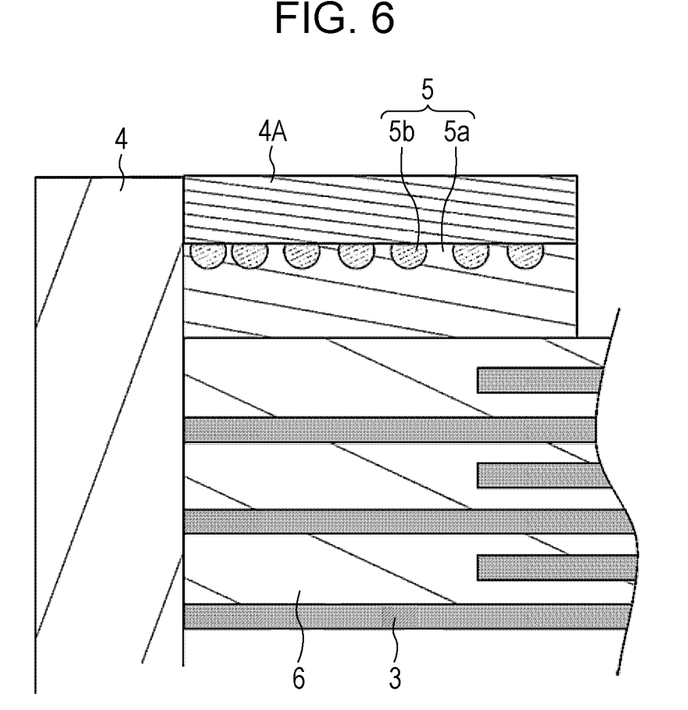
FIG. 6 is an enlarged cross-sectional view near an underlying layer in another example of the present invention.

Furthermore, as illustrated in FIG. 6, exposed surfaces of the metal particles 5b can be particularly flush with the surface of the base 5a. In this case, the extending portion 4A can be formed on the surface of the underlying layer 5, the surface having no irregularities, by an electroless plating method or an electrolytic plating method. Thus, the extending portion 4A having a uniform thickness can be formed. In order to form such exposed surfaces of the metal particles 5b that are flush with the surface of the base 5a, the surface of the underlying layer 5 is polished before the step of plating.

In addition, as illustrated in FIG. 6, the metal particles 5b can be particularly placed in the underlying layer 5 only at the side of the extending portion 4A. This structure allows the metal particles 5b to be exposed to the extending portion 4A, such that the extending portion 4A can be formed by an electroless plating method or an electrolytic plating method, while the other side of the underlying layer 5 can be formed of only a ceramic sintered body, which is the base 5a. Consequently, the underlying layer 5 in contact with the laminate 2 is formed of only a ceramic sintered body. Therefore, the sintering shrinkage ratio of the underlying layer 5 on the laminate side can be closer to that of the laminate. Thus, warpage of the laminate 2 during sintering can be further suppressed.

Figure 7:
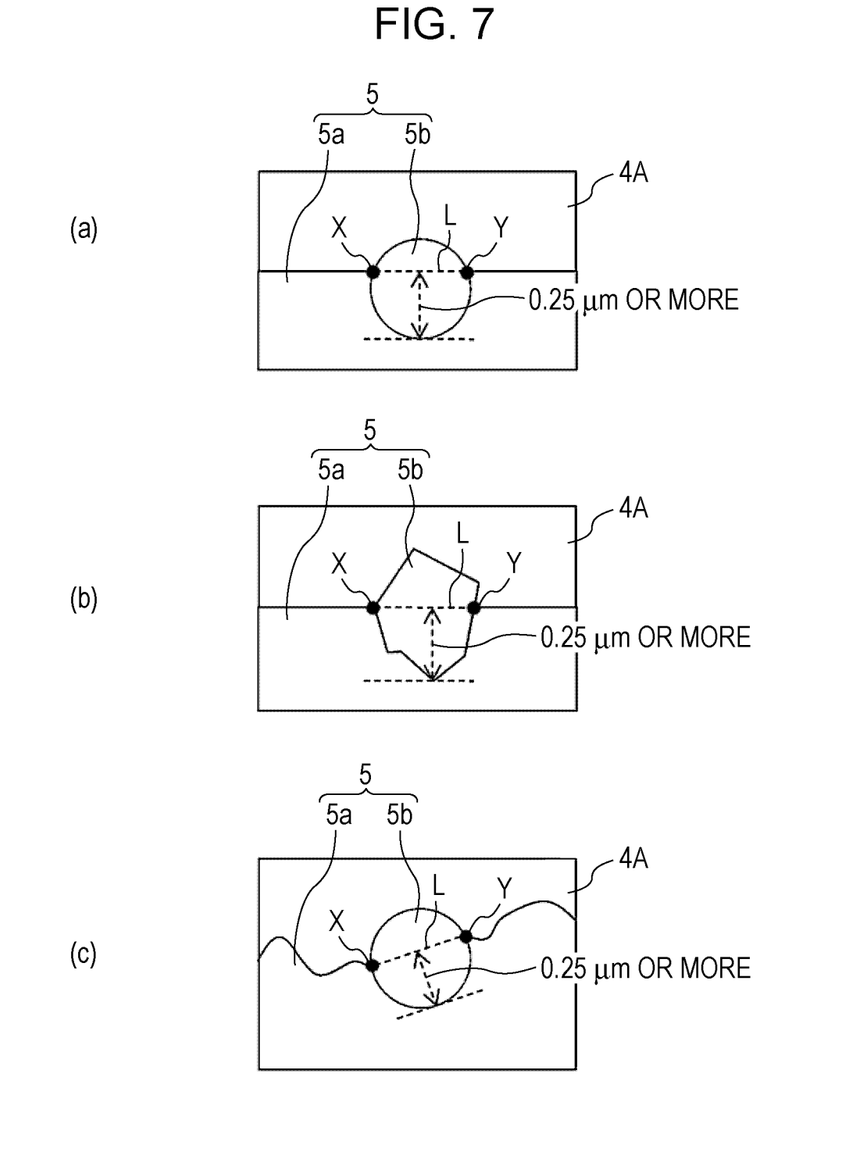

Furthermore, as in the example illustrated in FIG. 7(a), in the case where a metal particle 5b is present at the boundary between the extending portion 4A and the underlying layer 5, a metal particle 5b that satisfies the following condition is assumed to be a part of the underlying layer 5, and a metal particle 5b that does not satisfy the following condition is assumed to not be a part of the underlying layer 5. The condition is as follows: "In FIG. 7, when points which are located on a surface on the extending portion 4A side of the underlying layer 5 and at which the metal particle 5b and the base 5a are in contact with each other are denoted by X and Y, the length in a direction orthogonal to an imaginary line segment L connecting X and Y is 0.25 μm or more." This condition is similarly applied even in the case where the metal particle 5b has a shape other than a spherical shape, as in the example illustrated in FIG. 7(b). Furthermore, this condition is similarly applied even in the case where the boundary between the extending portion 4A and the underlying layer 5 curves, as in the example illustrated in FIG. 7(c).

Figure 8:
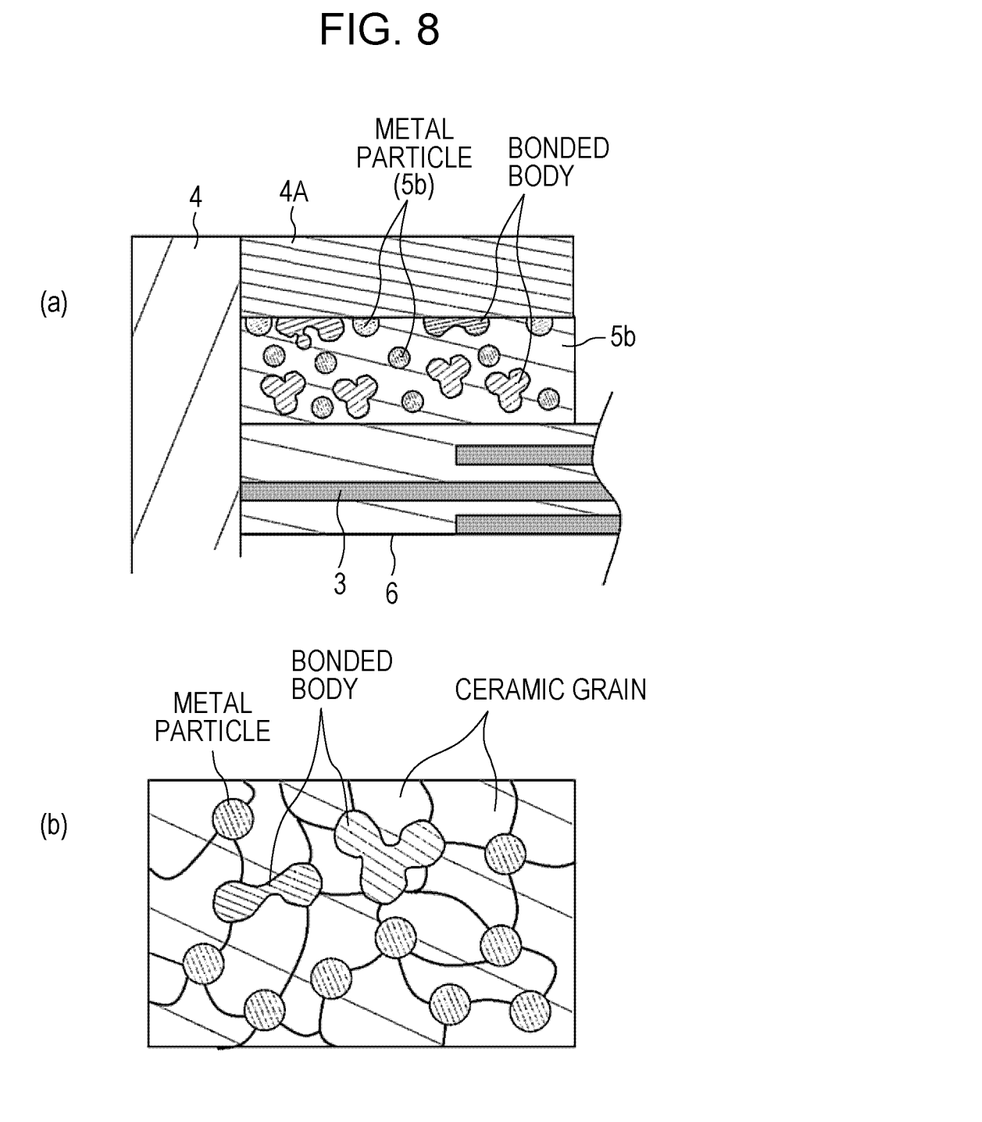

As illustrated in FIG. 8, the metal particles 5b can particularly bonded to each other to form a plurality of bonded bodies, and these bonded bodies are dispersed in the base 5a. In this case, the area of a part of the extending portion 4A protruding into the underlying layer 5 increases, thereby improving the anchoring effect. Thus, separation of the extending portion 4A from the underlying layer 5 can be more effectively suppressed. Furthermore, as in the example illustrated in FIG. 8, in the case where a bonded body is present at the boundary between the extending portion 4A and the underlying layer 5, a bonded body that satisfies the above-described condition is also assumed to be a part of the underlying layer 5.

REFERENCE SIGNS LIST

1: capacitor
2: laminate
2A: first main surface
2B: second main surface
3: inner electrode
4: outer electrode
4A: extending portion
5: underlying layer
5a: base
5b: metal particle
6: dielectric layer

The invention claimed is:

1. A capacitor comprising:
a laminate of a plurality of dielectric layers;
an inner electrode disposed between the dielectric layers of the laminate;
an outer electrode disposed on an end face of the laminate, the outer electrode connected to the inner electrode, the outer electrode having an extending portion extending to a first main surface of the laminate; and
an underlying layer disposed between the extending portion and the first main surface, the underlying layer comprising a base and metal particles, wherein the metal particles are directly joined to the extending portion of the outer electrode,
wherein the metal particles at an upper surface of the underlying layer partially enter the extending portion.

2. The capacitor according to claim 1, wherein the outer electrode is formed of a plating film.

3. The capacitor according to claim 1, wherein the base is formed of a ceramic sintered body.

4. The capacitor according to claim 1, wherein a distance between the metal particles dispersed in the underlying layer is 10 μm or less.

5. The capacitor according to claim 1, wherein a content ratio of the base in the underlying layer is 70% to 95% by weight, and a content ratio of the metal particles in the underlying layer is 5% to 30% by weight.

6. The capacitor according to claim 1, wherein the underlying layer includes a side of the extending portion and a side of the first main surface, wherein a content ratio of the metal particles at the side of the extending portion is higher than that at the side of the first main surface.

7. The capacitor according to claim 1, wherein an average particle diameter of the metal particles is 0.5 to 5 μm.

8. The capacitor according to claim 1, wherein the underlying layer includes a side of the extending portion and a side of the first main surface, wherein a ratio of an exposed area of the metal particles to a surface area of the underlying layer on the side of the extending portion is 5% to 45%.

9. The capacitor according to claim 1, wherein exposed surfaces of the metal particles are flush with a surface of the base.

10. The capacitor according to claim 1, wherein the metal particles are bonded to each other to form a plurality of bonded bodies, and the plurality of bonded bodies are dispersed in the base.

11. The capacitor according to claim 1, wherein the underlying layer comprises a ceramic sintered body as a main component.

12. The capacitor according to claim 1, wherein an upper surface of the underlying layer is scraped before the outer electrode is disposed.

13. The capacitor according to claim 1, wherein the metal particles at an upper surface of the underlying layer have a flat surface.

14. The capacitor according to claim 1, wherein the metal particles contained at an upper surface of the underlying layer are exposed to the extending portion, where the metal particles are joined to the extending portion.

15. The capacitor according to claim 1, wherein the metal particles are made of a material same as that of the outer electrode.

16. The capacitor according to claim 1, wherein the underlying layer includes a side of the extending portion and a side of the first main surface, wherein the metal particles are contained at an upper surface of the side of the extending portion, wherein the side of the first main surface consists of a ceramic sintered body.

17. A capacitor comprising:
a laminate of a plurality of dielectric layers;
an inner electrode disposed between the dielectric layers of the laminate;
an outer electrode disposed on an end face of the laminate, the outer electrode connected to the inner electrode, the outer electrode having an extending portion extending to a first main surface of the laminate; and
an underlying layer disposed between the extending portion and the first main surface, the underlying layer comprising a base and metal particles, wherein the metal particles are directly joined to the extending portion of the outer electrode,
wherein the underlying layer includes a side of the extending portion and a side of the first main surface, wherein a ratio of an exposed area of the metal particles to a surface area of the underlying layer on the side of the extending portion is 5% to 45%.

18. A capacitor comprising:
a laminate of a plurality of dielectric layers;
an inner electrode disposed between the dielectric layers of the laminate;
an outer electrode disposed on an end face of the laminate, the outer electrode connected to the inner electrode, the outer electrode having an extending portion extending to a first main surface of the laminate; and
an underlying layer disposed between the extending portion and the first main surface, the underlying layer comprising a base and metal particles, wherein the metal particles are directly joined to the extending portion of the outer electrode,
wherein exposed surfaces of the metal particles are flush with a surface of the base.

* * * * *